United States Patent [19]

Steigerwald et al.

[11] 4,374,355
[45] Feb. 15, 1983

[54] ELECTRICALLY ISOLATED BATTERY CHARGER FOR ON-BOARD ELECTRIC VEHICLE APPLICATIONS

[75] Inventors: Robert L. Steigerwald, Scotia; John N. Park, Rexford, both of N.Y.

[73] Assignee: General Electric Company, Schenectady, N.Y.

[21] Appl. No.: 239,725

[22] Filed: Mar. 2, 1981

[51] Int. Cl.³ .............................................. H02J 7/10
[52] U.S. Cl. ........................................ 320/43; 363/21
[58] Field of Search ...................... 363/20, 21; 320/39, 320/40, 43

[56] References Cited

U.S. PATENT DOCUMENTS

| 3,564,393 | 2/1971 | Williamson | 363/21 |
| 4,031,449 | 6/1977 | Trombly | 320/39 |
| 4,260,943 | 4/1981 | Zaderej et al. | 320/43 |

FOREIGN PATENT DOCUMENTS

| 2305971 | 8/1973 | Fed. Rep. of Germany | 320/39 |
| 55-13636 | 1/1980 | Japan | 363/21 |
| 404069 | 3/1974 | U.S.S.R. | 363/21 |

OTHER PUBLICATIONS

Intersil-Application Bulletin A035-Switchmode Converter Topologies-Make Them Work For You by Rudy Severns-pp. 1 & 18.

Primary Examiner—William H. Beha, Jr.
Attorney, Agent, or Firm—William H. Steinberg; James C. Davis, Jr.; Marvin Snyder

[57] ABSTRACT

A single transistor DC—DC battery charger provides ohmic isolation with a multiple winding high frequency transformer. The transistor's duty cycle is determined from an isolated voltage proportional to battery voltage obtained from a signal winding of the transformer when the transistor is off.

1 Claim, 5 Drawing Figures

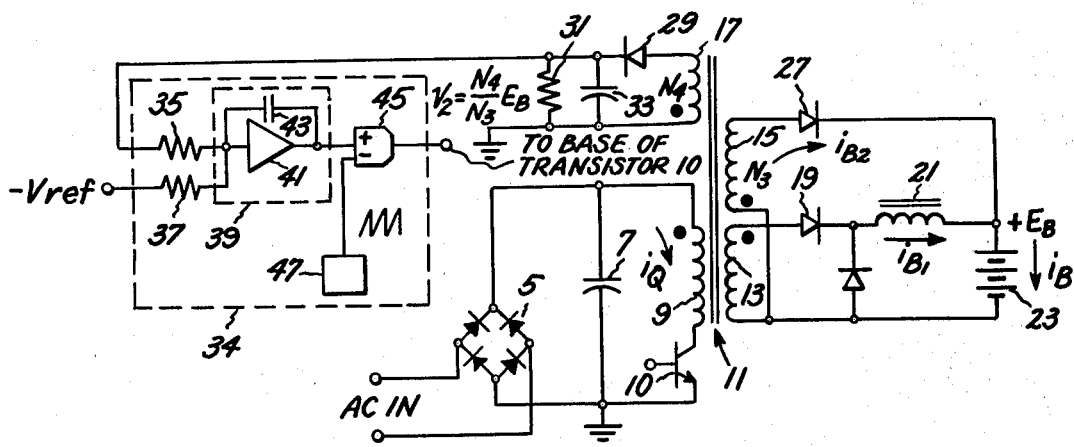
FIG.1
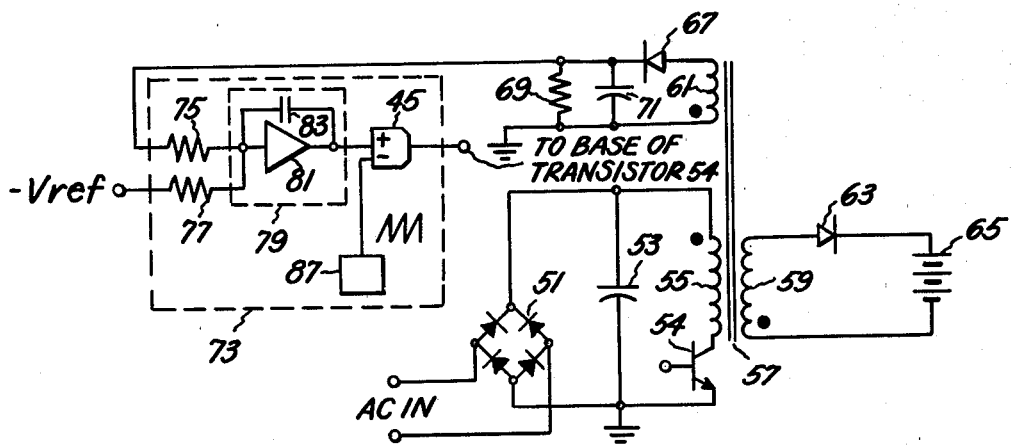
FIG.2
FIG.3A  $i_Q$
FIG.3B  $i_B$
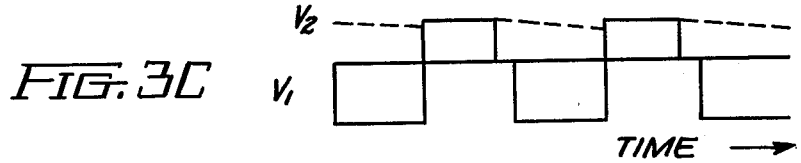
FIG.3C  $V_1$
TIME →

ELECTRICALLY ISOLATED BATTERY CHARGER FOR ON-BOARD ELECTRIC VEHICLE APPLICATIONS

The present invention relates to a DC-DC converter battery charger.

Two categories of on-board electric vehicle battery charges are those which provide electrical isolation between the AC power source and the battery and those that do not. Electrically isolated systems remove the danger of ground fault shocks. To get a shock from isolated equipment it's necessary to come in contact with both sides of the line supplying the battery. Electrically isolated systems have the advantage of permitting grounding of the vehicle frame independent of whether or not the battery has one terminal grounded, and allowing the potential of the charging circuit directly connected to the battery not to be tied to the AC power source.

It is an object of the present invention to provide a lightweight low cost electrically isolated battery charger suitable for use as an onboard electric vehicle battery charger.

SUMMARY OF THE INVENTION

In one embodiment, a four winding transformer having a primary, two secondaries and a signal winding, operates as a forward converter with a clamp winding on the secondary. The primary winding is in series with a controllable switch which cyclically interrupts the energy provided to the primary. When the controllable switch is "on", one winding of the secondary transfers energy to a battery to be charged. When the controllable switch is "off", the other secondary winding has the dual function of acting as a clamp on the voltage across the switch as well as providing additional energy to the battery from energy stored in the transformer core and airgap. Also while the switch is "off", a peak detector obtains a signal proportional to the battery voltage signal received by the signal winding. A battery charge rate regulator receives the signal from the peak detector and controls the duty cycle of the controllable switch to charge the battery. A rectifier connected to an alternating power source can supply the DC input to the primary. The battery remains ohmically isolated from the alternating power source.

In another embodiment, a three winding transformer having a primary, a secondary and a signal winding, operates as a flyback converter. The primary winding is in series with a controllable switch which cyclically interrupts the energy provided to the primary. The secondary transfers energy to a battery to be charged through a diode when the controllable switch is "off", from energy stored in the transformer core and airgap. Also while the switch is "off", a battery peak detector obtains a signal proportional to the battery voltage from the reflected voltage signal received by the signal winding. A battery charge rate regulator is connected to the output of the battery peak detector and controls the duty cycle of the switch to charge the battery. A rectifier connected to an alternating power source can supply the DC input to the primary. The battery remains ohmically isolated from the alternating power source.

BRIEF DESCRIPTION OF THE DRAWING

FIG. 1 shows a schematic representation of one embodiment of the present invention having a forward converter with a clamp winding on the secondary.

FIG. 2 shows a schematic representation of another embodiment of the present invention being a flyback converter.

FIGS. 3A to 3C show voltage and current waveforms helpful in explaining the operation of FIG. 1.

DETAILED DESCRIPTION OF THE DRAWING

Referring now to the drawing and especially FIG. 1 thereof there is shown a full wave rectifier 5 supplied by a single phase AC source (not shown). The output of the rectifier is connected across a capacitor 7 which provides a low impedance source to the series combination of a controllable switch and a primary winding 9 of a four winding high frequency transformer 11 which is connected across the capacitor 7. In addition to the primary winding 9, the four winding transformer 11 has secondary winding 13, a secondary winding 15, and a signal winding 17. In FIG. 1 the controllable switch is shown as an NPN transistor having a base, an emitter and a collector with the collector connected to one end of the primary winding and the emitter connected to capacitor 7.

One end of secondary 13 is connected to the anode of a diode 19. The cathode of diode 19 is connected to one end an inductor 21. The other end of inductor 21 is connected to the positive terminal of a battery 23 to be charged. The negative terminal of battery 23 is connected to the other end of secondary 13. The anode of diode 25 is connected between the cathode of diode 19 and one end of choke 21. The cathode of diode 25 is connected to the negative terminal of the battery. One end of secondary 15 is connected to the anode of diode 27. The cathode of diode 27 is connected to the positive terminal of the battery. The other end of secondary 15 is connected to the negative terminal of battery 23.

One end of signal winding 17 is connected to the anode of a diode 29. The cathode of diode 29 is connected to one end of the parallel combination of a resistor 31 and a capacitor 33 which operates as a peak detector. The other end of the parallel combination of resistor 31 and capacitor 33 is connected to the other end of signal winding 17 and to the emitter of transistor 10. A battery charge regulator 34 has an input from the cathode of diode 29 which is connected to one end of resistor 35. A negative voltage reference is connected to one end of resistor 37. The other end of resistor 35 and 37 and connected together to form a summer. The output of the summer is connected to the input of integrator 39. Integrator 39 has an operational amplifier with a capacitor 43 connected between the input and output of operational amplifier 41. The output of integrator 39 is connected to one input of comparator 45 and the output of triangle waveform generator 47 is connected to the other. The output of comparator 45 is connected to the base of transistor 10. The relative polarities of windings 9, 13, 15 and 17 are shown by dots according to the convention that the end of winding 9 connected to the capacitor 7, the end of secondary winding 13 connected to diode 19, the end of secondary winding 15 connected to the negative terminal of battery 23, and the end of signal winding 17 connected to the emitter of transistor 10 all have the same polarity at the same time.

Referring now to FIG. 2, there is shown a full wave rectifier 51 supplied by a single phase AC source. The output of the rectifier is connected across a capacitor 53 which provides a low impedance source to the series combination of a controllable switch and a primary winding 55 of a three winding high frequency transformer 57 which is connected across the capacitor 53. In FIG. 2 the controllable switch is shown as an NPN transistor having a base, an emitter and a collector with the collector connected to one end of the primary winding and the emitter connected to capacitor 53. In addition to the primary winding 55, the three winding transformer 57 has a secondary winding 59 and a signal winding 61.

One end of secondary winding 59 is connected to the anode of diode 63 and the cathode of diode 63 is connected to the positive terminal of a battery 65 to be charged. The negative terminal of battery 65 is connected to the other end of secondary 59.

One end of signal winding 61 is connected to the anode of a diode 67 and the cathode of diode 67 is connected to one end of the parallel combination of a resistor 69 and capacitor 71 which operates as a peak detector. The other end of the parallel combination of resistor 69 and capacitor 71 is connected to the other end of signal winding 61 and to the emitter of transistor 54. A battery charge regulator 73 has an input from the cathode of diode 67 connected to one end of resistor 75. A negative voltage reference is connected to one end of resistor 77. The other end of resistor 75 and 77 are connected together to form a summer and the output of the summer is connected to the input of integrator 79. Integrator 79 has an operational amplifier 81 with a capacitor 83 connected between the input and the output of the operational amplifier. The output of integrator 79 is connected to one input of comparator 77 and the output of a triangle waveform generator 87 is connected to the other. The output of comparator 45 is connected to the base of transistor 54.

The relative polarities of windings 55, 59 and 61 are shown by dots according to the convention that the end of primary winding 55 connected to capacitor 53, the end of secondary winding 59 connected to diode 63 and the end of signal winding 61 connected to emitter of transistor 54 each have the same polarity at the same time.

The operation of FIG. 1 will now be described. A single phase AC source is full wave rectified by rectifier 5. The output of the rectifier is connected across capacitor 7 which is relatively small (e.g. typically 10 uf) and provides a low impedance source to the high frequency (e.g. typically 20 KHz) chopper. The converter operates from substantially unfiltered 120 Hz rectified line voltage. When transistor 10 is turned on, energy is transferred to the battery 23 from secondary winding 13 through diode 19, and choke 21. Diodes 25 and 27 are back biased. When transistor 10 turns off energy is supplied to the battery from choke 21 with diode 25 providing a return path. Also during the transistor off period the battery is also charged by energy stored in the transformer core and airgap which is released through secondary winding 15 supplying battery charging current through diode 27. Thus all of the energy switched by transistor 10 ends up in the battery resulting in good transistor utilization. FIG. 3A shows the current flowing in transistor 10. FIG. 3B shows the battery charge current which is supplied by the source during the transistor on time and by the energy stored in choke 21 $i_{B1}$, and the energy stored in the transformer 11 core and airgap during the transistor off time $i_{B2}$. Secondary winding 15 also serves to clamp the voltage across transistor 10 when the transistor turns off by clamping the primary winding. The primary winding is clamped to the battery voltage times the turn ratio of secondary winding 15 to primary winding 9.

FIG. 3C shows the voltage $v_1$ appearing across signal winding 17. The portion of the voltage $v_1$ appearing across signal winding 17 when the transistor is on is blocked by diode 29 of the peak detector. The portion of $v_1$ appearing across signal winding 17 when transistor 10 is off is the reflected battery voltage. Diode 29 passes this voltage to the capacitor resistor peak detector which holds the voltage $v_2$ which is proportional to battery voltage and ohmically isolated therefrom. Voltage $v_2$ is equal to the turns ratio of winding 17 to winding 15 times the battery voltage less the diode drops. A reference voltage proportional to the desired battery voltage during charging is subtracted from the output of the capacitor resistor peak detector in a summer comprising resistors 35 and 37 to obtain an error signal. The error signal is integrated in integrator 39 and compared to a triangle waveform from a function generator 47 in comparator 45. The output of the comparator is connected to the base of transistor 10. The duty cycle of transistor 10 is the ratio of on time of the transistor to the period of the triangle waveform. The duty cycle increases if the battery reference voltage desired is increased. With the reference voltage constant, the duty cycle is constant (assuming constant source voltage) and the current flowing to charge the battery is dependent on the battery state of charge.

The operation of FIG. 2 is similar to the operation of FIG. 1 except that energy is transferred to the battery only when the transistor 54 turns off. The energy transferred is the energy that was stored in the transformer core and airgap when the transistor was on. Diode 67 connected to signal winding 61 allows the reflected battery voltage to be stored in the peak detector circuit when transistor 54 is off as occurred in FIG. 1. The determination of the duty cycle by the battery charge rate regulator 73 is the same as in connection with battery charge rate regulator 34 of FIG. 1.

It is understood that the foregoing detailed description is given merely by way of illustration and many modifications can be made therein without departing from the spirit or scope of the present invention.

What we claim as new and desire to secure by letters patent of the United States is:

1. An electrically isolated battery charger comprising:
   rectifier means adapted to be connected to an external AC supply;
   a four winding transformer having a primary winding, two secondary windings and a signal winding;
   controllable switch means connected between said rectifier means and said primary winding for cyclically interrupting the power delivered to said primary winding;
   a choke;
   a first diode connected in series with one of said secondaries, said choke and a battery to be charged, said first diode poled so that power is delivered to the choke and the battery when said controllable switch means is on, and when said controllable switch means is off energy stored in said choke is delivered to the battery;

a second diode connected in series with the other of said secondaries and the battery to be charged said second diode poled so that energy stored in said transformer core and airgap is delivered to the battery when said controllable switch means is off and no energy is delivered by said other secondary when said controllable switch means is on;

battery peak detector means coupled to said signal winding for obtaining a signal proportional to the battery voltage while said battery is being charged and said controllable switch is off; and battery charge rate regulator means coupled to the output of said battery peak detector means for controlling the duty cycle of said controllable switch means to control battery charging.

* * * * *